United States Patent [19]

Bees

[11] Patent Number: 4,716,569
[45] Date of Patent: Dec. 29, 1987

[54] POWER SUPPLY FOR NEGATIVE IMPEDANCE GAS DISCHARGE LASERS

[75] Inventor: George L. Bees, Ashland, Mass.

[73] Assignee: A.L.E. Systems, Inc., Ashland, Mass.

[21] Appl. No.: 849,843

[22] Filed: Apr. 9, 1986

[51] Int. Cl.$^4$ ................................................ H01S 3/04
[52] U.S. Cl. ........................................ 372/38; 372/69;
372/81; 315/DIG. 7
[58] Field of Search ...................... 372/38, 82, 81, 55,
372/69; 315/DIG. 7, 209 R

[56] References Cited

U.S. PATENT DOCUMENTS 4,234,822 11/1980 Garrison et al. ................. 315/209 R
4,613,934 9/1986 Pacholok ..................... 315/DIG. 7

Primary Examiner—Leon Scott, Jr.
Attorney, Agent, or Firm—Irving M. Kriegsman

[57] ABSTRACT

An adjustable, constant current power supply for use in electrically pumping negative impedance gas discharge lasers is disclosed. The power supply includes a voltage regulator and a constant current power source the output of the voltage regulator which is variable and controlled being connected to the input of the constant current power source. The output from the power supply is passed through a gaseous lasing medium located within a laser tube of the gas discharge laser in order to pump to the lasing medium. Be controlling the voltage fed into the constant current power source the current output therefrom can be altered in order to effectively vary the power output of the gas discharge laser.

20 Claims, 3 Drawing Figures

POWER SUPPLY FOR NEGATIVE IMPEDANCE GAS DISCHARGE LASERS

BACKGROUND OF THE INVENTION

The present invention relates generally to power supplies for lasers and, more particularly to a power supply for electrically pumping negative impedance gas discharge lasers.

Over the last few decades a variety of different classes of lasers have been developed. One such class of lasers, which has proven to be extremely useful, is the gas-discharge laser. In this particular class of laser, lasing action can occur at many wavelengths in any of a number of different gases under suitable discharge conditions. For example, output powers for continuous type gas discharge lasers range from approximately 1 uw to 100 w in the visible region. Furthermore, outputs can be generated by gas discharge lasers over wavelengths which span the ultraviolet and visible regions as well as extend up to more than 800 um in the infrared region.

Examples of some of the more widely known gas discharge lasers are the helium-neon laser which generally produces red light at the 632.9 nm wavelength with a power output as low as a few milliwatts or as high as about a watt; the argon and krypton-ion gas discharge lasers which produce light in the visible and near-ultraviolet wavelength regions having power outputs typically from 1-10 W but which can produce more than 100 W; and molecular gas lasers, such as for example the $CO_2$ laser which can emit an extremely large power output at a wavelength of 10.6 microns.

The gas discharge laser has become an extremely practical device with a wide variety of different uses. For example, the $CO_2$ laser is especially effective in medical application where, emitting in the infrared range, it has become a great surgical cutting and coagulation too. Another practical application of the $CO_2$ laser is in welding. In both of these instances the $CO_2$ laser produces power in the range of approximately 1000–15,000 W.

A major problem, however, which has been encountered with some types of gas discharge lasers has been the pumping of the laser into the upper energy levels. Typically, a glowing electric discharge can be excited in a gaseous lasing medium by passing a dc current through the gas. In such a discharge some fraction of the gas atoms are ionized, creating a mixture of neutral atoms, positively charged ions, and free electrons. Accelerated electrons then collide energetically with atoms and ions, exciting them into higher levels. The atoms and ions decay back to lower energy levels partially by spontaneous emission, which creates a beam of electromagnetic energy which is outputted from the laser tube (resonant cavity). For a dc discharge, an emitting cathode and an anode are placed inside the laser (discharge) tube, and the dc current is passed between them. As is well known, one of the unique characteristics of some gas discharge lasers is that they have a negative, impedance or slope at discharge. Because of this feature, these lasers are somewhat difficult to run (since the power supply must be custom tailored to run the laser.) Since the impedance at discharge has a negative slope, these lasers are commonly referred to as negative impedance gas discharge lasers. Examples of negative impedance gas discharge laser are the CO laser and the helium-neon laser. An example of a positive impedance gas discharge laser is an ion laser.

One way employed in the past for making a regular power supply, such as a fixed or constant voltage source, stable into a negative impedance gas discharge laser has been to couple a real impedance (i.e. resistor), larger than the impedance of the laser, in series between the laser and the power supply. Since the real impedance is larger than the negative impedance of the laser, the combination produces an impedance that is real and positive. Examples of a constant voltage source are a wall socket or a transformer.

Unfortunately, a constant voltage source pumping system has a substantial number of drawbacks associated with it. First of all, there is a substantial loss in power which takes place at the added resistor; that is, power which ordinarily could be used to pump the laser. Secondly, complex cooling arrangements have been required in an attempt to alleviate this heat loss problem at this resistor and this provides for additional fabrication problems. Thirdly, reliance upon a voltage source for the pumping current can create instability in the current output which adversely affects laser operations. Fourthly, this type of power supply has lacked an effective means of adjusting the current utilized to pump the gaseous lasing medium.

Another way of providing a power supply that is stable into a negative impedance gas discharge laser has been to use a constant current source instead of a constant voltage source. The problem with is type of power supply, however, is that it is not easily adjustable.

It is therefore abundantly clear that there exists a substantial need for an improved power supply for negative impedance gas discharge lasers, one which not only provides for a constant current output, but also which is capable of effectively adjusting this constant current output over a wide range of currents in order to vary the output power of the laser.

SUMMARY OF THE INVENTION

The present invention overcomes the problems set forth in detail hereinabove by providing an adjustable, constant current power source for gas discharge lasers which not only effectively supplies constant (stable) current to electrically pump the laser, but also has the capability of being able to vary the amount of current supplied over a wide range of values.

More specifically, the power supply of the present invention comprises two main components; namely, (1) a means for providing a constant (stable) source of current, and (2) a means for providing a variable voltage to the input of the constant current source in order to adjustably vary the current output of the constant current source.

This constant, yet adjustable current supply is electrically connected to a negative impedance gas discharge laser, such as a Co laser, for example, in order to electrically pump the laser and control the output power supplied by the laser. With the present invention the inherently unstable pumping current produced by the constant (stable) current source which also has the capability of effectively and selectively altering the output power of the laser.

The above-mentioned major components are in the form of conventional electrical components which have been combined in a unique manner in order to custom tailor the power supply for the negative impedance gas discharge laser. For example, the variable voltage source may be a conventional Buck regulator while the constant current source may be a conventional current soruce inverter (CSI).

In operation, the output current of the CSI is passed through the gaseous laser medium, (CO, for example), situated within the laser tube (resonant cavity) of the laser. With the present invention, this current is constant (stable) and by appropriately varying the input voltage through the Buck regulator, the output current from the CSI can be effectively varied, thereby altering the output power from the gas discharge laser.

If desirable, the voltage of the Buck regulator can be controlled by a feedback loop which senses the current provided by the CSI to the laser tube and compares this current to a standard or desired current for a particular laser use. As a result thereof, the voltage emanating from the regulator can be varied in accordance with the intended use of the laser in order to provide a predetermined amount of output power from the laser over a preselected interval of time.

It is therefore an object of this invention to provide a new and improvide power supply for a gas discharge laser.

It is another object of this invention to provide an adjustable, yet constant current power supply for a negative impedance gas discharge laser.

It is a further object of this invention to provide an extremely effective gas discharge laser system.

It is another object of this invention to provide an adjustable, constant current power supply for a gas discharge laser which relies upon readily available, electrical components for its fabrication.

It is yet still another object of this invention to provide a power supply for a negative impedance gas discharge laser that is primarily a current source as opposed to a voltage source.

It is even a further object of this invention to provide an adjustable, constant current power supply for a gas discharge laser which is highly reliable in operation, yet economical to produce.

For a better understanding of the present invention, together with other and further objects thereof, reference is made to the following detailed description, taken in connection with the accompanying drawings, and its scope will be pointed out in the appended claims.

BRIEF DESCRIPTION OF THE DRAWINGS

In the drawings wherein like reference numerals represent like components.

DETAILED DESCRIPTION OF THE PREFERRED EMBODIMENT

Figure 1:
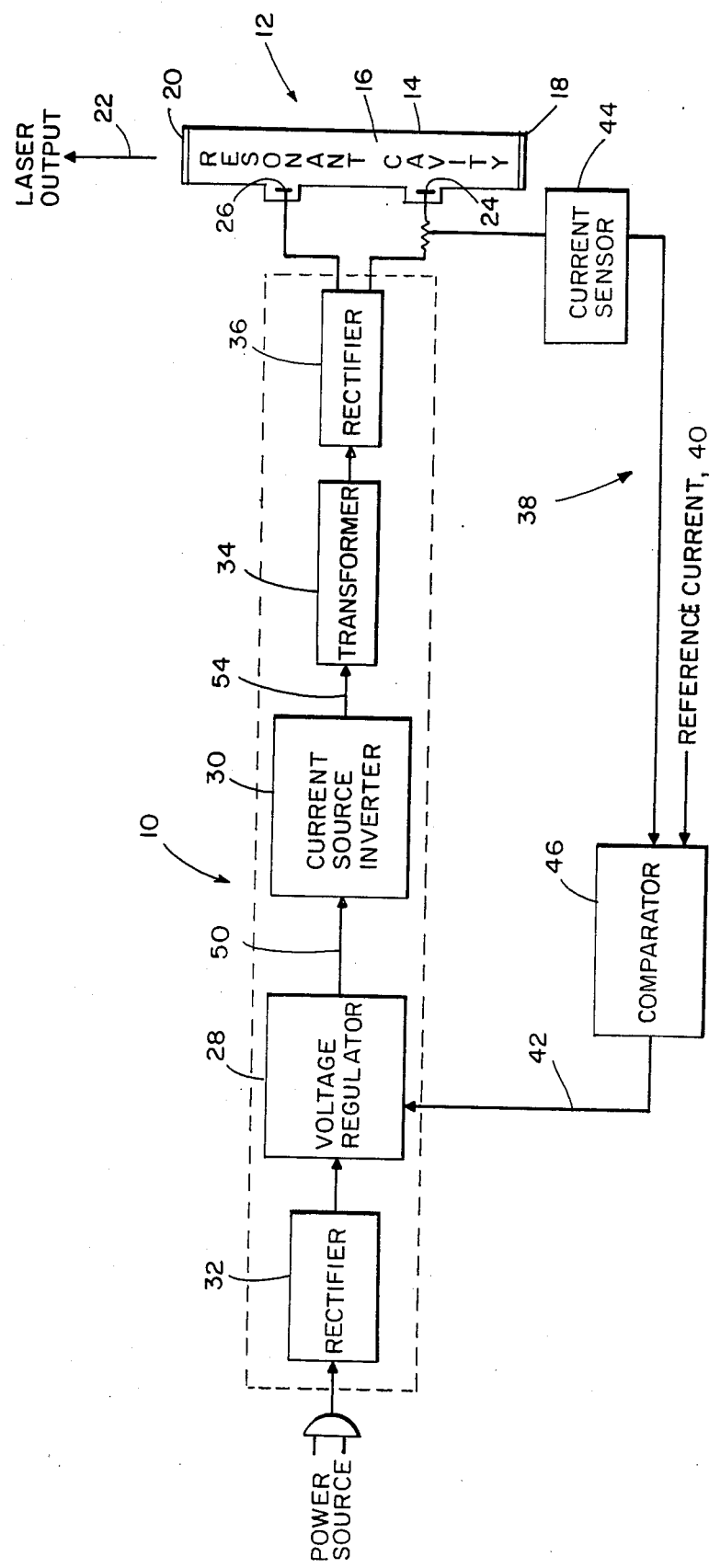
FIG. 1 is a block diagram of a gas discharge laser system including the components making up the adjustable, constant current power supply of the present invention.

Reference is now made to FIG. 1 of the drawings which clearly illustrates in block diagram form an adjustable, constant (stable) current power supply of this invention, the adjustable, constant current power supply being designated generally by reference numeral 10. Although the power supply 10 of the present invention may have widespread utility, its main use is in providing electrical pumping for a negtive impdeance gas discharge laser. Although the specific type of negative impedance gas discharge laser may vary in accordance with this invention, a CO laser is a typical example. As shown in FIG. 1, power supply 10 is electrically coupled to the resonant cavity of a negative impedance gas discharge laser 12.

As explained in the Background of the Invention, the pumping provided by power supply 10 enables lasing of the gaseous medium located within laser tube 14 and resonant cavity 16 to take place, with the resonant cavity 16 of laser 12 being defined by the area between reflective elements 18 and 20 situated at adjacent opposite ends of tube 14. Conventionally, one of the reflective elements 20 allows for a beam of electromagnetic radiation to pass therethrough laser output 22. In addition, a pair of electrodes 24 and 26 are provided within tube 14 for electrically connecting the adjustable, constant current power supply 10 thereto.

As shown in FIG. 1 of the drawings, power supply 10 is made up of several components. One of the main components is a variable voltage source or voltage regulator 28 and another main component is a constant current source 30. Although these components 28 and 30 may be made up of a variety of different electronic elements, it is preferred with the present invention that voltage regulator 28 be in the form of a conventional Buck regulator, such regulator being well known in the art and described in the General Electric Transistor Manual, copyright 1982, General Electric Company U.S.A. Semiconductor Products Department, Auburn, N.Y., 13021, which publication is incorporated herein by reference. Examples of other voltage regulators that may be employed are a Variac and a phase controller. The preferred make up of constant current source 30 is in the form of a conventional current source inverter (CSI), an example of which is described in Power Semiconductor Drives, S. W. Dewan, G. R. Stermon and A. Straughen, The University of Toronto, John Wiley and Sons, Chapter 10 also incorporated herein by reference. By connecting the input of the constant current source 30 to the output of voltage regulator 28 as shown it it possible to vary or adjust the constant (stable) current output from source 30.

The remaining components of the adjustable, current power supply 10 include a means 32 for converting an incoming ac voltage emanating from any suitable power source such as an electrical wall outlet (not shown) into a DC voltage, a means 34 for matching the output current/power from current source 30 to the requirements of gas discharge laser 12, another means 36 for converting the ac current output from component 34 into dc current, and a feedback circuit 38 which can be used to sense the current which flows through laser 12 and compare this current with a reference current 40 in order to provide a control signal over a line 42 to appropriately vary the voltage output from regulator 28.

More specifically, both the ac and dc converting means 32, 36 may be in the form of any sutable conventional full-wave rectifier while means 34 may be in the form of any suitable high voltage transformer. The feedback circuit 38 may be made of a number of conventional items such as any suitable current sensor 44 and any suitable comparator 46.

Figure 2:
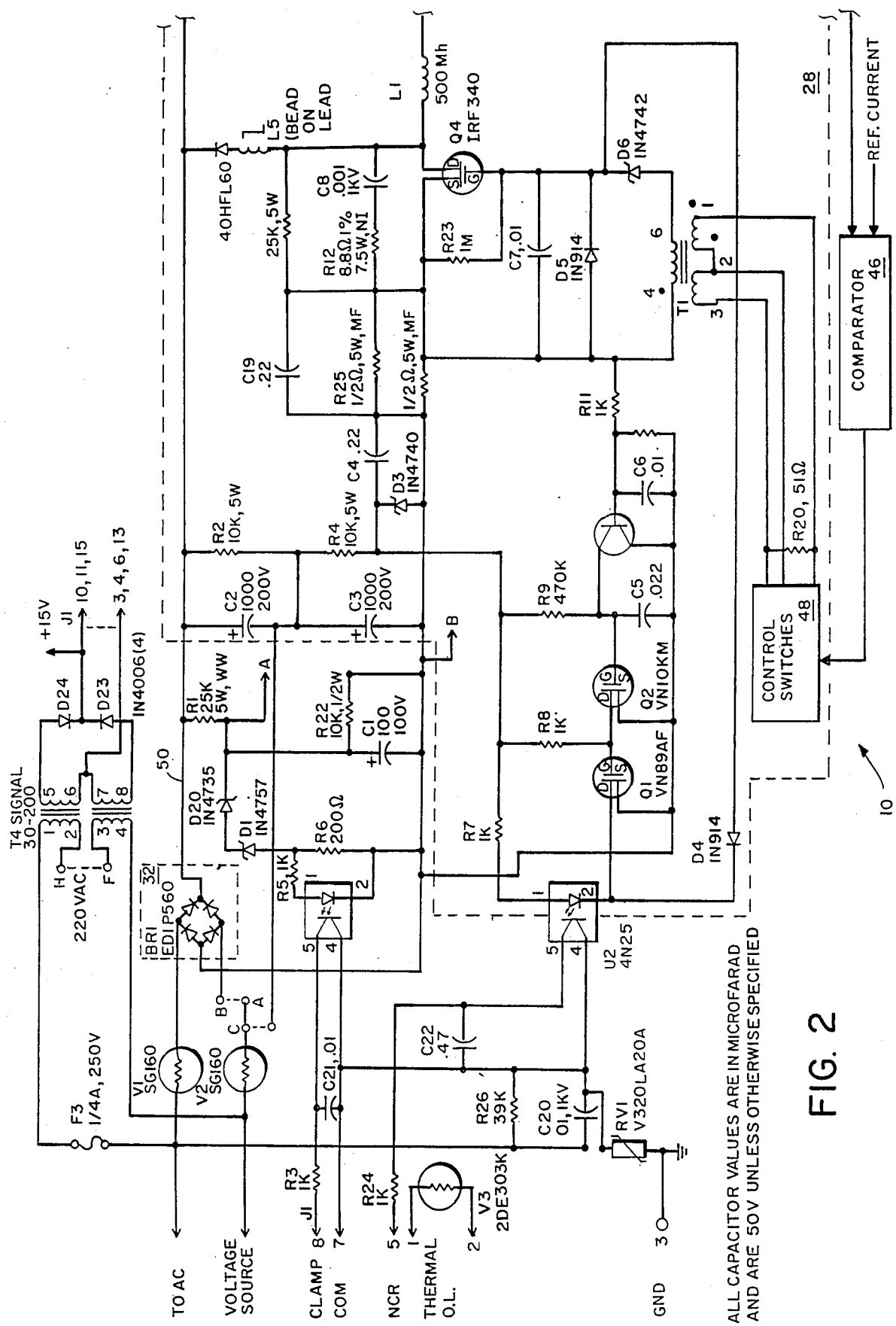
FIG. 2 is a circuit diagram of the adjustable, constant current power supply of the present invention.
Figure 2:
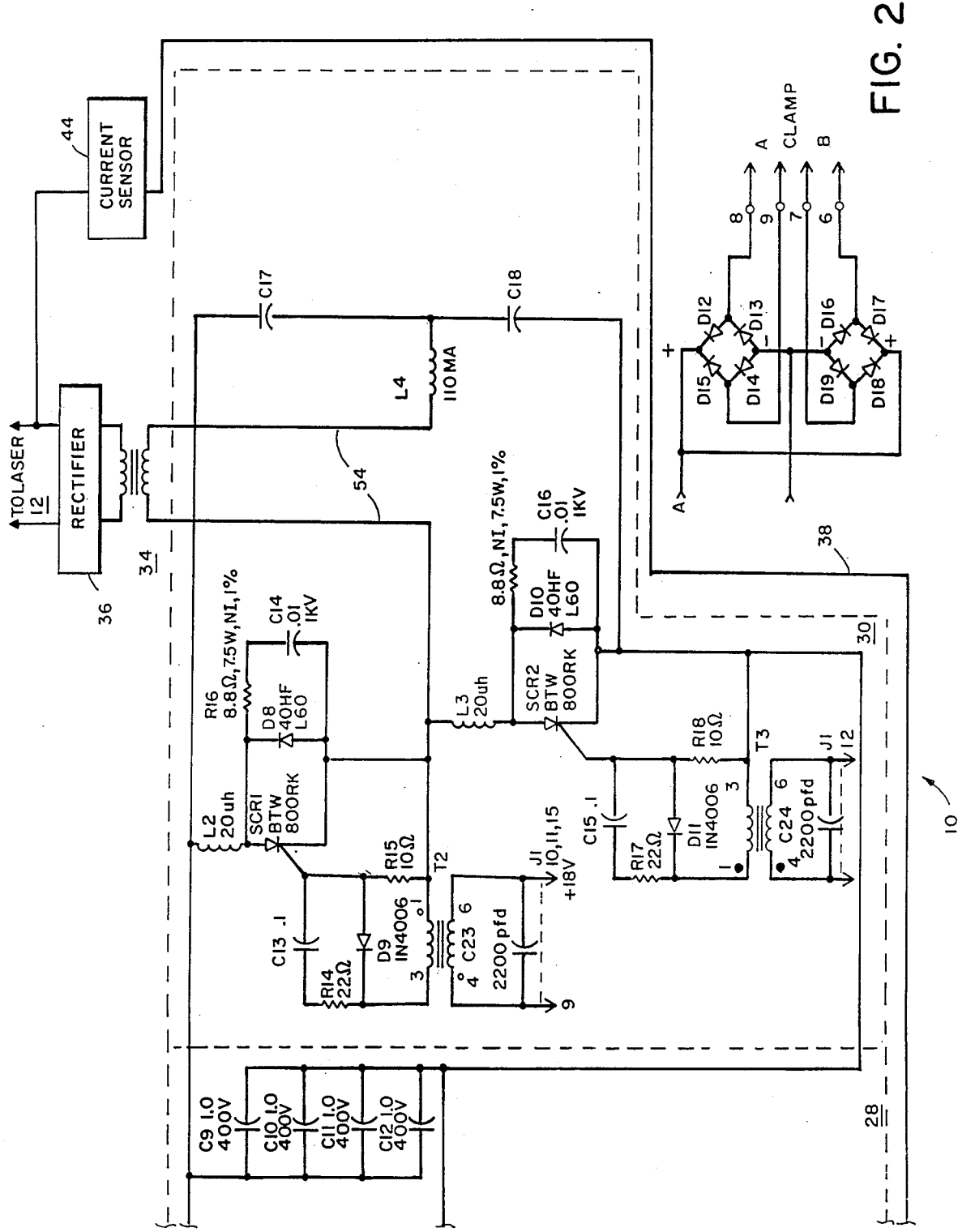

A circuit diagram represetive of an implemention of the adjustable, constant current supply 10 including feedback circuit 38 and gas discharge laser 12 is set forth in FIG. 2 of the drawings. In the circuit diagram of FIG. 2 each of the major components of power supply 10 are individually identified by being encompassed by dashed lines, with the same reference numerals utilized in FIG. 1 being used to depict like components n FIG. 2.

For example, rectifier 32 is illustrated as being made up of a series of diodes arranged in a conventional bridge configuration; voltage regulator 28 is a typical Buck regulator and includes a control switch 48; and constant current source 30 is a typical current source inverter which includes means to convert the incoming dc voltage to ac as well as appropriate capacitors and inductors to provide constant (stable) output current. A conventional high voltage transformer 34 and rectifier 36 are also depicted in FIG. 2.

BEST MODE OF OPERATION

Figure 3:
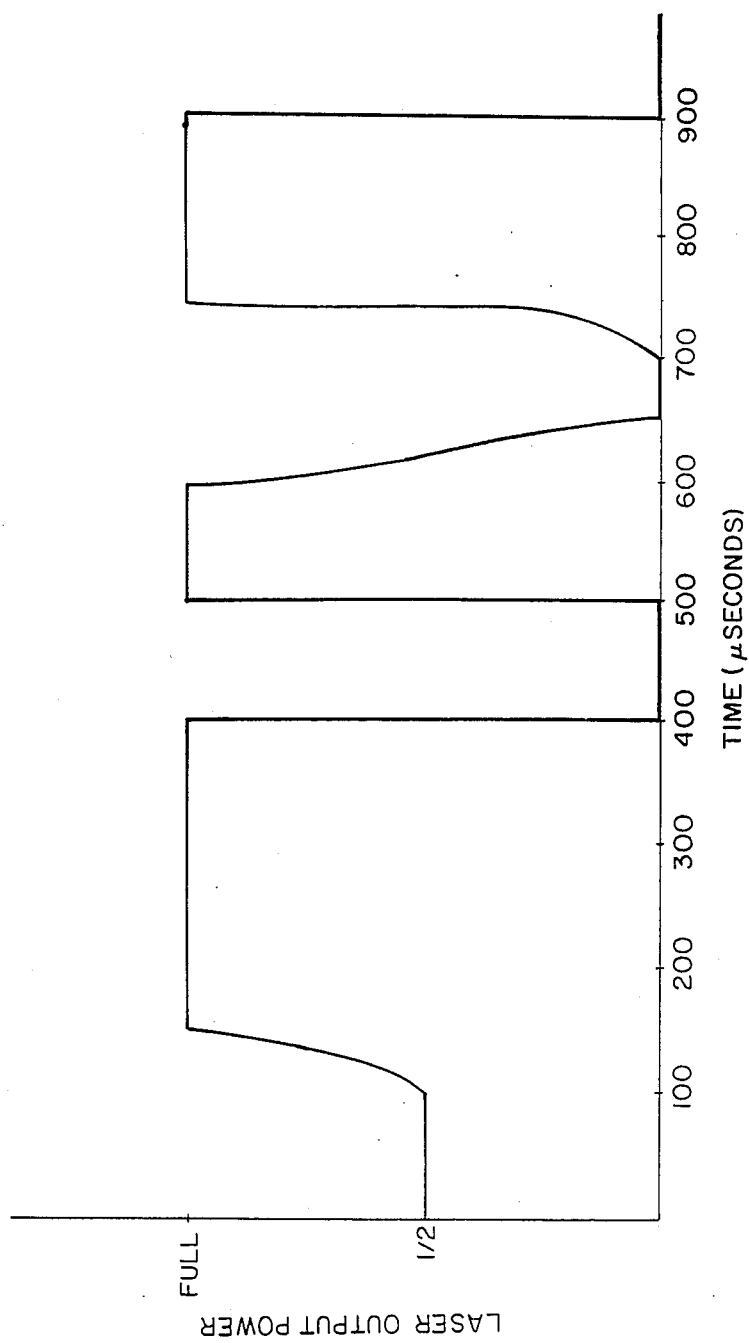
FIG. 3 is a graphic representation of laser output power versus time during the operation of a gas discharge laser utilizing the adjustable, constant current power supply of the present invention.

Reference is made to FIGS. 1-3 for a description of the operation of a gas discharge laser system including the adjustable, constant current supply 10 of the present invention. Power is initially supplied from any suitable wall outlet. This power supply is generally an ac voltage source and therefore must be converted into dc voltage prior to entering voltage regulator 28. Rectifier 32 is interposed between the power supply (wall outlet, not shown) and regulator 32. As pointed out hereinabove regulator 28 may be in the form of a conventional BUCK regulator. Regulator 28 has the capability of varying (adjusting) the output of the dc voltage being fed into constant current source 30 over a line 50.

Constant current source 30 alters the incoming dc to ac and provides for an output over line 54 of constant (stable) current, the value of which may be varied by varying the voltage output from regulator 28. As pointed out hereinabove, constant current source 30 is typically a conventional current source inverter (CSI).

The ac current/power output from CSI 30 is matched to the requirements of gas discharge laser 12 by high voltage transformer 34 and the current output therefrom is then reconverted into dc by rectifier 36 for acceptance by laser 12. This output current is passed through the pair of electrodes 24 and 26 which are located within the laser tube 14. The current electrically pumps the gaseous lasing medium within tube 14 and as such regulates the power of laser output 22.

As illustrated in the graph of FIG. 3, varying the voltage out of regulator 28 can effectively alter the output power of laser 12 with respect to time. In other words, the output power of laser 12 may vary from zero power to full power over a range of micro seconds merely by altering (adjusting) the voltage fed into the constant current source 30.

More specifically, with the present invention, the electrical pumping current provided by current power supply 10 remains constant until such time that the voltage being applied to source 30 is altered. Only adjustment of voltage 50 will vary constant current 54. The subsequent power output 22 of laser 12 is directly related to this voltage charge. A typical operating sequence is depicted in FIG. 3. In this graphic representation, for example, ½ power is increased to full power in the first 100 u seconds, where it remains at full power for approximately 200 um seconds. At that time, the voltage is decreased to zero. Thereafter, full power is once again reached at the 500 um second time period and a constant for approximately 100 u seconds. It is then gradually decreased to zero. The present invention, therefore, is extremely effective in surgical applications, for example, where exact control of laser output is essential.

In addition, a feedback circuit 38 can be utilized in the present invention to sense current output from CSI 30 for comparison with a reference current 40. Such an arrangment provides for automatic control of voltage regulator 28 by control signal 42. Control signal 42 is representative of the comparison of actual current with preselected current.

The present invention provides for a constant current source for pumping a gas discharge laser with the current output being adjustable over a wide range of values by the amount of voltage fed thereto. It is to be understood, however, that various modifications and changes may be made within the spirit and scope of the invention as set forth in the appended claims.

What is claimed is:

1. An adjustable constant current power supply for a negative impedance gas discharge laser, comprising:
   means for providing constant output of current, means connected between said constant current providing means and said gas discharge laser for matching the current output of said constant current providing means with lasing requirements of said gas discharge laser, said constant current providing means providing electrical energy to pump the gas discharge laser; and
   means electrically connected to said constant current providing means for feeding a variable controlled voltage to said constant current providing means said variable voltage altering said constant output of current over a preselected range feedback circuit means for providing a control signal to said variably controlled voltage feeding means;
   such that output power of the gas discharge laser varies with said output of current from said current providing means.

2. An adjustable constant current power supply for a gas discharge laser as defined in claim 1 wherein said constant current providing means comprises a current source inverter.

3. An adjustable constant current power supply for a gas discharge laser as defined in claim 1 wherein said variable voltage feeding means comprises a BUCK regulator.

4. An adjustable constant current power supply for a gas discharge laser as defined in claim 1 wherein said variably controlled voltage feeding means is connected to a source of ac voltage, and means for converting said ac voltage to dc voltage is electrically connected between said voltage source and said variably controlled voltage feeding means.

5. An adjustable constant current power supply for a gas discharge laser as defined in claim 4 wherein said constant current providing means includes means for converting dc current to ac current in order to provide a constant output of ac current.

6. An adjustable constant current power supply for a gas discharge laser as defined in claim 5 further comprising means for converting said ac current into dc current prior to passing said dc current through the gas discharge laser.

7. An adjustable constant current power supply for a gas discharge laser as defined in claim 6 said feedback circuit means comprising means for sensing said dc current prior to passing through the gas discharge laser and comparing said sensed dc current with a preselected current to provide said control signal to said variably controlled voltage feeding means.

8. An adjustable constant current power supply for a gas discharge laser as defined in claim 7 and wherein the constant current providing means comprises a current source inverter.

9. An adjustable constant current power supply for a gas discharge laser as defined in claim 8 and wherein the variable voltage feeding means comprises a BUCK regulator.

10. An adjustable constant current power supply for a gas discharge laser as defined in claim 9 wherein said matching means comprises a high voltage transformer.

11. An adjustable constant current power supply for a gas discharge laser as defined in claim 10 wherein said means for converting said ac current to dc current comprises a rectifier.

12. A gas discharge laser system, comprising:
a laser tube containing a gaseous medium and a pair of electrodes;
means optically aligned with each other at adjacent opposite ends of said laser tube defining a resonant cavity therebetween; and
a current power supply means for providing a constant current which is adjustable over a preselected range means connected between said constant current providing means and said laser tube for matching the current output of said constant current providing means with lasing requirements of said gaseous lasing medium, and feedback circuit means for providing a control signal to said variably controlled voltage feeding means, said current power supply means being electrically connected to said pair of electrodes to electrically pump said gaseous lasing medium so as to produce an output beam of electromagnetic radiation having power which is variable in direct relationship to said current.

13. A gas discharge laser system as defined in claim 12 wherein said current power supply means comprises:
means for providing a constant output of current; and
means electrically connected to said constant current supply means for feeding a variably controlled voltage to said constant current supply means said variable voltage altering said constant output of current over a preselected range.

14. A gas discharge laser system as defined in claim 13 and wherein the current providing means comprises a current source inverter.

15. A gas discharge laser system as defined in claim 14 and wherein the variable voltage feeding means comprises a BUCK regulator.

16. A gas discharge laser system as defined in claim 13 wherein said variably controlled voltage feeding means is connected to a source of ac voltage, and means for converting said ac voltage to dc voltage is electrically connected between said voltage source and said variably controlled voltage feeding means.

17. A gas discharge laser system as defined in claim 16 wherein said constant current providing means includes means for converting dc current to ac current in order to provide a constant output of ac current.

18. A gas discharge laser system as defined in claim 18 further comprising for matching the means for converting said ac current into dc current prior to passing said dc current through said pair of electrodes.

19. A gas discharge laser system as defined in claim 18 further comprising means for sensing said dc current prior to passing through said pair of electrodes and comparing said sensed dc current with a preselected current in order to provide a control signal to said variably controlled voltage feeding means.

20. An adjustable constant current power supply for a negative impedance gas discharge laser, comprising: a current source inverter providing a constant output of current for pumping said discharge laser gas; a high voltage transformer connected between said constant current source inverter and said gas discharge laser for matching the current output of said constant current source inverter with lasing requirements of said gas discharge laser; a voltage regulator electrically feeding a variable control voltage to said constant current source inverter, said variable voltage altering said constant output of current over a preselected range; and a feedback circuit providing a control signal to said variably controlled voltage regulator such that output power of said gas discharge laser varies with said output of current from said constant current source inverter.

* * * * *